US008052169B2

United States Patent
Yano et al.

(10) Patent No.: US 8,052,169 B2
(45) Date of Patent: Nov. 8, 2011

(54) GAS GENERATOR FOR INFLATING A GAS BAG OF A VEHICLE OCCUPANT RESTRAINT SYSTEM AND METHOD OF INFLATING A GAS BAG

(75) Inventors: Kanji Yano, Frankfurt am Main (DE); Katsumi Takazono, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/923,645

(22) Filed: Sep. 30, 2010

(65) Prior Publication Data

US 2011/0018243 A1    Jan. 27, 2011

Related U.S. Application Data

(63) Continuation of application No. PCT/EP2009/055668, filed on May 11, 2009.

(51) Int. Cl.
*B60R 21/26* (2011.01)
(52) U.S. Cl. ....................................................... 280/737
(58) Field of Classification Search .................. 280/737, 280/736
See application file for complete search history.

(56) References Cited

U.S. PATENT DOCUMENTS

| 5,031,932 | A | | 7/1991 | Frantom et al. | |
|---|---|---|---|---|---|
| 5,513,572 | A | * | 5/1996 | Frantom et al. | ............... 102/531 |
| 5,582,426 | A | * | 12/1996 | O'Loughlin et al. | ......... 280/741 |
| 5,615,912 | A | * | 4/1997 | O'Loughlin et al. | ......... 280/737 |
| 5,709,406 | A | * | 1/1998 | Buchanan | .................... 280/737 |
| 5,732,972 | A | | 3/1998 | Johnson et al. | |
| 5,762,368 | A | * | 6/1998 | Faigle et al. | ................... 280/737 |
| 6,042,146 | A | * | 3/2000 | Bauer et al. | ..................... 280/737 |
| 6,086,094 | A | * | 7/2000 | Stevens et al. | ................. 280/741 |
| 6,196,583 | B1 | * | 3/2001 | Ruckdeschel et al. | ........ 280/736 |
| 6,273,462 | B1 | | 8/2001 | Faigle et al. | |
| 6,273,464 | B2 | * | 8/2001 | Tokuda et al. | ................ 280/741 |
| 6,382,668 | B1 | * | 5/2002 | Goetz | ............................ 280/737 |
| 6,601,872 | B2 | * | 8/2003 | Zimbrich et al. | ............. 280/737 |

(Continued)

FOREIGN PATENT DOCUMENTS

DE   197 23 257 A1   12/1998

(Continued)

OTHER PUBLICATIONS

Office Action in JP Appln No. 2011-512911 dated May 25, 2011.

*Primary Examiner* — Paul N Dickson
*Assistant Examiner* — Nicole Verley
(74) *Attorney, Agent, or Firm* — Foley & Lardner LLP (57) ABSTRACT

A gas generator for inflating a gas bag of a vehicle occupant restraint system is provided. The gas generator includes an igniting means for producing gas and/or heat upon activation by a control signal of the vehicle. The gas generator also includes a first chamber comprising a propellant ignitable by gas and/or heat produced by the igniting means, and a second chamber comprising pressurized inflation gas. An outlet opening through which the inflation gas can flow out of the second chamber and into the gas bag is provided. The gas generator also includes a sealing means sealing the outlet opening. The gas generator is configured in such a way that after activation of the igniting means gas and/or heat produced by the igniting means ignites the propellant and a pressure wave is created under the direct or indirect impact of gas produced by the igniting means.

20 Claims, 8 Drawing Sheets

U.S. PATENT DOCUMENTS

| | | | |
|---|---|---|---|
| 6,786,507 B2 * | 9/2004 | Dolling et al. | 280/737 |
| 6,793,244 B1 * | 9/2004 | Katsuda et al. | 280/741 |
| 7,059,633 B2 * | 6/2006 | Wang et al. | 280/737 |
| 7,093,852 B2 * | 8/2006 | Inman et al. | 280/736 |
| 7,134,689 B2 * | 11/2006 | Matsuda et al. | 280/736 |
| 7,156,025 B2 * | 1/2007 | Ostin | 102/530 |
| 7,192,052 B2 * | 3/2007 | Smith et al. | 280/737 |
| 7,226,078 B2 * | 6/2007 | Green et al. | 280/737 |
| 7,360,788 B2 * | 4/2008 | Yano et al. | 280/737 |
| 7,393,008 B2 | 7/2008 | DiGangi et al. | |
| 7,419,183 B2 * | 9/2008 | Tokuda et al. | 280/737 |
| 7,431,337 B2 * | 10/2008 | Matsuda et al. | 280/741 |
| 7,520,531 B2 * | 4/2009 | Gammill | 280/737 |
| 7,527,291 B2 * | 5/2009 | Young et al. | 280/737 |
| 7,540,306 B2 * | 6/2009 | Matsuda et al. | 141/3 |
| 7,658,406 B2 * | 2/2010 | Townsend et al. | 280/737 |
| 7,784,827 B2 * | 8/2010 | Smith et al. | 280/737 |
| 2003/0116949 A1 | 6/2003 | Mizuno | |
| 2004/0130133 A1 | 7/2004 | Yamazaki et al. | |
| 2005/0073138 A1 | 4/2005 | Digangi et al. | |
| 2005/0146123 A1 | 7/2005 | Bergmann et al. | |
| 2005/0189750 A1 * | 9/2005 | Gotoh et al. | 280/737 |
| 2005/0212272 A1 * | 9/2005 | Fogle, Jr. | 280/737 |
| 2005/0236821 A1 * | 10/2005 | Hofmann et al. | 280/737 |
| 2006/0103123 A1 * | 5/2006 | Myers | 280/736 |
| 2006/0255577 A1 * | 11/2006 | Nakayasu et al. | 280/737 |
| 2008/0061540 A1 | 3/2008 | Smith et al. | |
| 2008/0142127 A1 | 6/2008 | Kitayama et al. | |
| 2009/0108572 A1 * | 4/2009 | Smith et al. | 280/737 |

FOREIGN PATENT DOCUMENTS

| | | |
|---|---|---|
| EP | 0 800 966 A1 | 10/1997 |
| EP | 1 559 621 A2 | 8/2005 |
| FR | 2 902 389 | 12/2007 |
| JP | 11-512048 | 10/1999 |
| JP | 2001-500835 | 1/2001 |
| JP | 2003034220 A | 2/2003 |
| JP | 2003-520153 | 7/2003 |
| JP | 2003252167 A | 9/2003 |
| JP | 2004-026025 | 1/2004 |
| JP | 2006-137417 | 6/2006 |
| JP | 2006160049 A | 6/2006 |
| JP | 2008-509799 | 4/2008 |
| JP | 2008174215 A | 7/2008 |
| WO | WO-98/08716 | 6/1998 |
| WO | WO-01/42047 A2 | 6/2001 |
| WO | WO 2007/147776 A1 | 12/2007 |

\* cited by examiner

GAS GENERATOR FOR INFLATING A GAS BAG OF A VEHICLE OCCUPANT RESTRAINT SYSTEM AND METHOD OF INFLATING A GAS BAG

CROSS-REFERENCE TO RELATED PATENT APPLICATIONS

This application is a Continuation of International Patent Application PCT/EP2009/055668, filed May 11, 2009. The foregoing application is incorporated by reference herein in its entirety.

BACKGROUND

The invention relates to a gas generator for inflating a gas bag of a vehicle occupant restraint system and a method of inflating a gas bag of a vehicle occupant restraint system.

Known from the prior art are hybrid gas generators which comprise a source of pressurized inflation gas ("cold gas") in combination with a source of combustion gas created by the combustion of a propellant.

SUMMARY

A problem to be solved by the invention is to provide a gas generator which produces a sufficient amount of gas and which at the same time reduces the risk of damaging the gas bag when being inflated as much as possible.

According to an exemplary embodiment of the invention a gas generator for inflating a gas bag of a vehicle occupant restraint system is provided, comprising igniting means for producing gas and/or heat upon activation by a control signal of the vehicle;

a first chamber comprising a propellant ignitable by the gas and/or heat produced by the igniting means, a second chamber comprising pressurized inflation gas;

an outlet opening through which the inflation gas can flow out of the second chamber and into the gas bag;

sealing means sealing the outlet opening, wherein the gas generator is configured in such a way that after activation of the igniting means gas and/or heat produced by the igniting means ignites the propellant and a pressure wave is created in the pressurized gas under the direct or indirect impact of gas produced by the igniting means, wherein the pressure wave breaks the sealing means such that inflation gas can escape from the second chamber via the outlet opening.

The pressure wave in the second chamber can be, for example, generated by employing further sealing means (e.g. a burst disk) that seal a volume of the igniting means, wherein the sealing means break if the pressure in the volume exceeds a certain value. Thus, due to the breakage of the further sealing means (i.e. in particular due to the pressure difference between the volume and the second chamber), a high impact is exerted on the stored pressurized inflation gas due to the pressure difference between the volume and the second chamber, i.e. due to the abrupt flow of gas out of the volume and into the second chamber, such that the pressure wave is induced in the inflation gas.

For example, the volume is pre-filled with air or another gas, in particular an incombustible gas such as nitrogen or helium. Further, the igniting means can be configured in such a way that the further sealing means break under the impact of a pressure wave created in the gas present in the volume before activation of the igniting means by gas and/or heat released by the igniting means into the volume.

However, it is also possible that the pressure wave in the pressurized inflation gas is generated by the direct thermal and/or mechanical impact of the gas produced by the igniting means, i.e. by an abrupt inflow of gas produced by the igniting means into the second chamber.

Further, the ignition of the propellant does not necessarily have to be triggered directly by gas generated by the igniting means but can, for example, also be created by heat generated upon activation of the igniting means, the heat being conveyed to the propellant (in particular by convection or thermal conduction). The igniting means, for example, comprise a conventional igniter used in conventional gas generators for ignition of a propellant. Further, it is possible that the igniting means also produce (solid) particles that support the impact of the gas released by the igniting means when activated.

According to an example of the invention, the inflation gas is stored in the second chamber under a pressure of approximately 60 MPa, wherein a variety of inflation gases can be used; for example inert gases (such as argon) or gases that react with combustion gases created by the combustion of the propellant. Further, a solid propellant can be used, in particular in form of a plurality of a propellant tablets or rings.

Further more, the gas generator can be configured in such a manner that inflation gas not mixed with gas generated by combustion of the propellant exists the second chamber through the outlet opening (after breakage of the sealing means) before a mixture of inflation gas and combustion gas generated by combustion of the propellant reaches the second chamber.

As the gas bag will, thus, be inflated by the (cold) inflation gas first, it will be already partly inflated when the (hotter) mixture of inflation gas and combustion gas flows into the gas bag. Therefore, gas bag layers that otherwise could be damaged by the hotter gas mixture are already moved away from the gas generator during the first state of inflation such that the thermal impact of the gas mixture on the gas bag layers is reduced.

In an example, the sealing means are broken by the pressure wave generated in the inflation gas about 1.5 ms after activation of the igniting means. Further, the gas mixture comprising inflation gas and combustion gas flows into the gas bag only about 6 ms after activation of the igniting means. Thus, according to this example, the gas bag is inflated by cold inflation gas for the first 6 ms such that the gas bag is unfolded to some extent when the hotter gas mixture starts to flow into the gas bag.

Moreover, as the sealing means are destroyed by means of a pressure wave and not by combustion gas that is generated by the combustion of the propellant, the delay between the beginning of the inflation of the gas bag with unmixed pressurized inflation gas and the point in time when the gas mixture flows into the gas bag can be adjusted by the configuration of the flow path between the igniting means and the propellant. Examples of different flow path configurations are given below.

The sealing means used for sealing the outlet opening, for example, comprise a burst plate (in particular a burst disk) which is arranged in the area of the outlet opening such that the passage through the outlet opening is initially blocked.

According to another example of the invention, the gas generator is configured in such a way that the sealing means break and inflation gas escapes from the outlet opening before combustion gas generated by the combustion of the propellant enters into the second chamber. Thus, the pressurized inflating gas partly will have left the second chamber when the combustion gas begins to enter into the second chamber and mix with the (remaining) inflation gas.

Further more, the gas generator can comprise a passage through which gas and/or heat produced by the igniting means can flow from the igniting means into the second chamber.

According to another exemplary embodiment of the invention, the passage for the gas and/or heat produced by the igniting means is located on a first side of the second chamber and the outlet opening of the second chamber is located on a second side of the second chamber opposite to the first side. For example, the second chamber extends longitudinally, e.g. the second chamber is formed by a hollow, in particular hollow cylindrical, part (e.g. a container). In the case of a hollow cylindrical part, the passage and the outlet opening are located in the endings of the part, which lie opposite to each other along a longitudinal axis of the hollow part.

Further, the gas generator can comprise at least one inlet opening through which combustion gas generated by combustion of the propellant can flow from the first to the second chamber. For example, the inlet opening is arranged between the first chamber and the above mentioned passage between the igniting means and the second chamber such that combustion gas can flow through the inlet opening and the passage into the second chamber. In addition or alternatively, an inlet opening can be provided between the first and the second chamber such that combustion gas can flow directly from the first to the second chamber without having to flow through the passage for the gas.

Further, also the first chamber can be formed by a hollow cylindrical, longitudinal part, in which the igniting means are disposed, i.e. the first chamber extends around the igniting means. Thus, the first and the second chamber can be formed by a first and second hollow part, respectively, wherein, in particular, an end of the first hollow part is connected to an end of the second hollow part.

For example, the first and the second hollow part are connected to each other in a form fitting manner, e.g. by crimping the first and the second hollow part together. Further, the first and the second hollow part can be fixed to each other by bonding, e.g. by welding. In another example, the first and the second hollow part are integrally formed, i.e. a single hollow part, in particular in the form of a tube, is used, in which a separator is arranged to form the first and the second chamber within the hollow part.

According to another exemplary embodiment of the invention, the gas generator comprises a hollow element (e.g. in the form of a hollow cylindrical retainer) forming part of the passage between the igniting means and the second chamber for guiding gas and/or heat created upon activation of the igniting means towards the second chamber. For example, a tube-like hollow element is arranged axially with respect to the igniting means and the second chamber, wherein gas pre-dominantly emerges from the igniting means along the longitudinal axis of the hollow element.

Moreover, one end of the hollow element can be connected to the igniting means, wherein an opposite end extends towards the second chamber such that gas is guided through the hollow element in a direction along the longitudinal axis towards the second chamber. In particular, the hollow element is arranged in such a way that it is surrounded by the first chamber and e.g. forms an inner side wall of the first chamber. For example, the first chamber extends co-axially with respect to the hollow element.

In a cylindrical configuration of the first and the second hollow part, the above mentioned passage (formed at least partially between the igniting means and the second chamber by the hollow element) and the outlet opening of the gas generator can be arranged aligned to each other along a centre axis of the first and the second hollow part. Further more, the first chamber can extend annually around the igniting means centred on the longitudinal axis of the first and the second hollow part.

Further, at least one inlet opening can be arranged in the surface of the hollow element such that gas created upon activation of the igniting means can reach the propellant positioned in the first chamber through these openings. In a variant, a plurality of openings is arranged radially along the circumference of the hollow element. Also, combustion gas generated by combusting the propellant can escape from the first chamber via the inlet openings. By choosing the number and the position of the inlet openings it is possible to adjust the flow rate of the combustion gas that enters into the second chamber.

In another exemplary embodiment, the inlet openings in the surface of the hollow element are the only openings through which generated combustion gas can flow into the second chamber, i.e. the combustion gas created after igniting the propellant has to take the way back through the inlet openings in the surface of the hollow element and through the hollow element towards the second chamber. In particular, there is no direct passage between the first and the second chamber.

According to another exemplary embodiment of the invention, the first and the second chamber are separated by a sealing element which comprises an opening which forming part of the above mentioned passage through gas can flow from the igniting means to the second chamber. For example, in particular if the first and the second chamber are formed by a hollow cylindrical retainer, the sealing element has a ring-like shape surrounding the passage.

Also, the sealing element can comprise at least one further opening through which gas which was created upon activation of the igniting means and which entered into the second chamber can flow from the second chamber into the first chamber to ignite the propellant. In particular, there are no other openings or passages through which gas could reach the propellant in the first chamber such that the gas has to flow into the second chamber first before being able to enter into the first chamber. This variant provides a longer delay between the beginning of the outflow of inflation gas (after the breakage of the sealing element) and the arrival of combustion gas at the outlet opening of the gas generator.

The invention also relates to a gas bag module comprising a gas bag and a gas generator for inflating the gas bag according to the embodiments described above. In particular, the gas bag module is configured in such a way that, in a first phase, the gas bag is inflated by pressurized inflation gas not mixed with gas generated by combustion of the propellant, and, in a subsequent second phase, the gas bag is inflated by a mixture of pressurized inflation gas and gas generated by combustion of the propellant.

Moreover, the invention also relates to a method of inflating a gas bag of a vehicle occupant restraint system, comprising the steps of:

providing a gas generator having a first chamber comprising a propellant and a second chamber comprising pressurized inflation gas, wherein the second chamber further comprises an outlet opening initially sealed by sealing means, through which the pressurized gas can flow into the gas bag when unsealed;

creating a pressure wave in the pressurized inflation gas such that the sealing means are broken under the impact of the pressure wave and inflation gas escapes into the gas bag; and igniting the propellant and guiding gas created by combustion of the propellant upon igniting into the second chamber.

BRIEF DESCRIPTION OF THE DRAWINGS

In the following, embodiments of the invention are described with respect the drawings, wherein.

DETAILED DESCRIPTION

Figure 1:
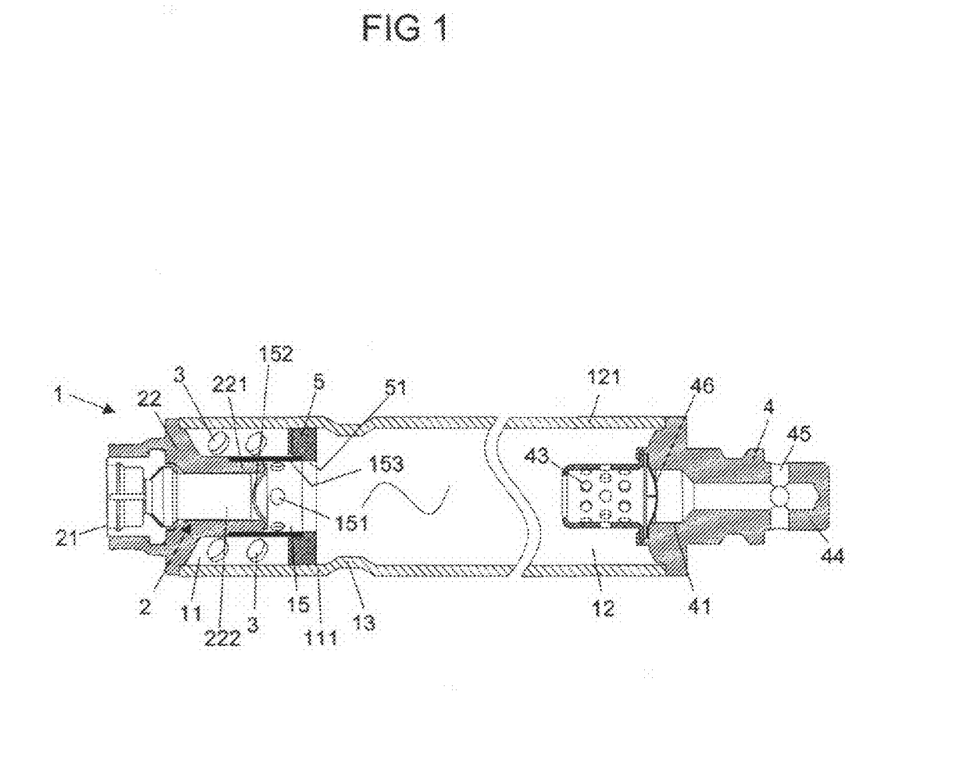
FIG. 1 illustrates a gas generator according to a first embodiment of the invention.

FIG. 1 depicts a sectional view of a gas generator 1 according to a first embodiment of the invention. The gas generator comprises igniting means in the form of a pyrotechnical igniter 2 that can be activated by an electrical signal of a vehicle occupant restraint system. For connecting to a control unit of the restraint system, the igniter comprises an electrical interface 21.

Further, the gas generator 1 comprises a first chamber 11 that extends annularly around the igniter 2, wherein a plurality of propellant tablets 3 is arranged in the first chamber. Adjacent to the first chamber 11 extends a second chamber 12 in which pressurized inflation gas is stored. The first and the second chamber 11, 12 are formed by a first and a second hollow cylindrical part 111 and 121, respectively, that are connected to each other by a crimp or a weld 13.

The gas generator 1 further comprises an outlet opening 41 through which at least some of the inflation gas stored in the second chamber can flow out of the gas generator and into a gas bag (not shown). The outlet opening 41 is formed in an outlet part 4 of the gas generator that is arranged in one end of the second hollow part 121, the outlet opening 41 being initially closed by sealing means in the form of a burst disk 46.

Moreover, an outer section 44 of the outlet element 4 comprises gas channels 45 in communication with the outlet opening 41, such that gas that escapes from the second chamber 12 through the outlet opening 41 is distributed into the gas bag via the channels 45. The outlet part 4 further comprises a filter 43 arranged inside the second chamber and configured to filter the gas in the second chamber before it exits the second chamber through the outlet opening 41.

Further, the gas generator 1 comprises a hollow element 15 that forms part of a passage 153 through which gas and/or heat produced by the igniter 2 can flow from the igniter into the second chamber. More particularly, the igniter 2 is arranged within a holder 22 that is connected to one end of the first hollow part 111. The holder 22 comprises a hollow cylindrical portion 221 to which one end of the hollow element 15 is mounted such that the hollow cylindrical portion 221 and the hollow element 15 simultaneously provide an inner side wall of the first chamber 11.

The other end of the hollow element 15 is received in a centre bore 51 of an angular sealing element 5 located between the first and the second chamber 11, 12. The bore 51 together with the hollow element 15 forms the passage 153 through which gas can flow from the igniter 2 into the second chamber 12. The passage 153 is initially blocked by a sealing element in the form of a passage burst disk 152 which, for example, is fixed to the hollow cylindrical portion 221 of the igniter holder 22 and arranged between the igniter 2 and the hollow element 15.

Further, the igniter 2 comprises a volume in the form of hollow cylindrical part 222 located adjacent to the burst disk 152. Upon activation of the igniter 2, the hollow cylindrical part 222 is filled with gas released by the igniter. If the pressure in the hollow cylindrical part 222 exceeds a maximum value, which depends on the configuration of the burst disk 152, the burst disk 152 breaks. As a result, a pressure wave is induced in the inflation gas contained in the second chamber 12; in particular due to the fact that after breakage of the burst disk 152 gas accumulated in the hollow cylindrical part 222 abruptly flows into the second chamber 12. The working principle of the gas generator according to the invention is illustrated in detail below with respect to FIGS. 2A to 2D.

Further, a plurality of inlet openings 151 is radially arranged in the surface of the hollow element 15 through which gas from igniter 2 can flow into the first chamber 11 in order to ignite the propellant 3. Also, combustion gas created by combustion of the propellant 3 can flow back from the first chamber 11 into the passage 153 through the openings 151 such that the combustion gas can flow into the second chamber 12 via openings 151 and passage 153.

Figure 2A:
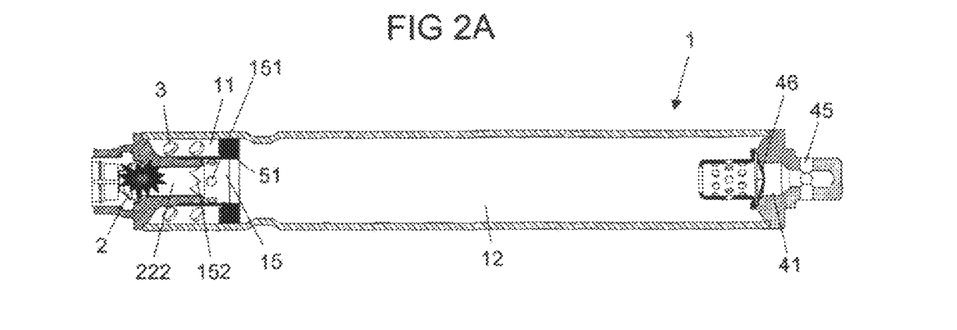
FIG. 2A illustrates the working principle of a gas generator according to the invention.

According to FIG. 2A, the igniter 2 is activated upon receiving a signal from a control unit or a sensor of a vehicle occupant restraint system. Upon activation, the igniter 2 outputs hot gas, which enters into the hollow cylindrical fillable volume 222. Under the impact of the gas pressure in the hollow cylindrical part 222 the passage burst disk 152 breaks if the pressure inside the volume exceeds a certain maximum value. After breakage of the burst disk 152 gas 60 accumulated in the hollow cylindrical part 222 abruptly exits and enters into the second chamber 12 through the passage 153 formed by the hollow element 15 and the bore 51.

Figure 2B:
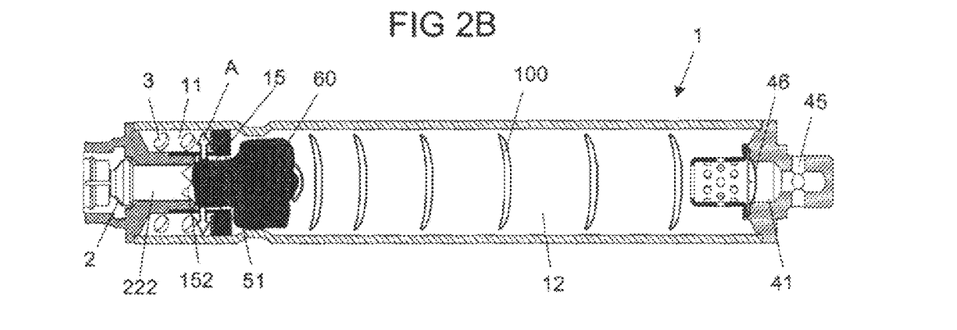
FIG. 2B illustrates the working principle of a gas generator according to the invention.

Under the impact of the breaking burst disk 152 and the abruptly intruding gas 60 a pressure wave is produced in the pressurized inflation gas stored in the second chamber 12. The pressure wave is indicated in FIG. 2B by wave fronts 100 that propagate through the inflation gas located in the second chamber 12 from the first end (facing towards the igniter 2) of the second chamber towards its second end comprising the outlet opening 41.

Further, under the impact of the pressure wave 100 the burst disk 46 sealing the outlet opening 41 breaks such that the outlet opening 41 is uncovered and pressurized inflation gas can exit the gas generator via the outlet opening 41 and the adjacent distribution channel 45.

Figure 2C:
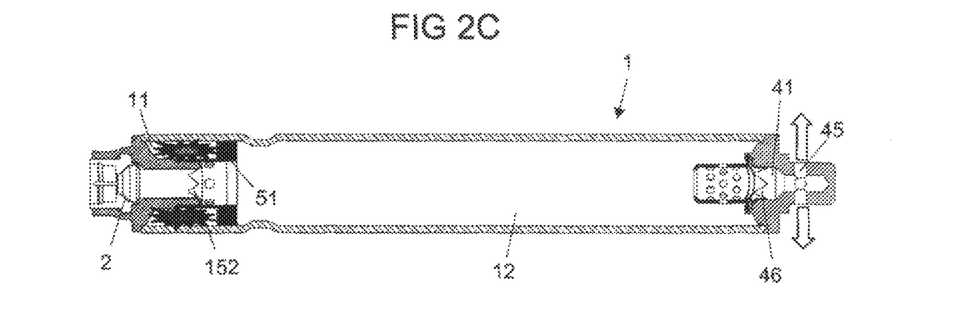
FIG. 2C illustrates the working principle of a gas generator according to the invention.
Figure 2D:
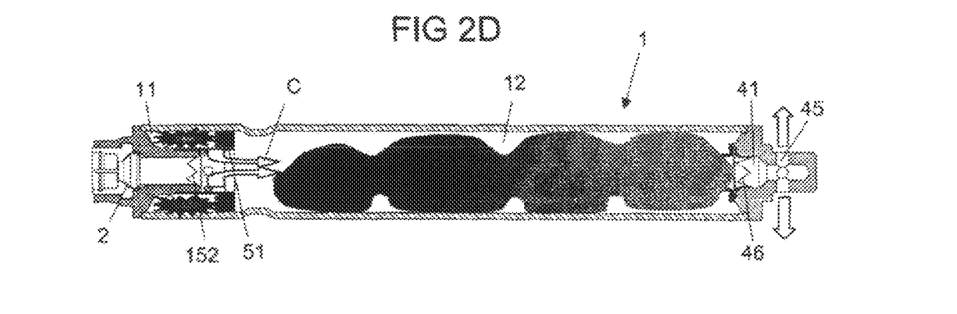
FIG. 2D illustrates the working principle of a gas generator according to the invention.

As the gas and/or heat generated by the igniting means not only enters into the second chamber 12 but also flows into the first chamber 11 via the radial openings 151 of the hollow element 15 (as indicated by arrows A in FIG. 2B), the propellant 3 is ignited after activation of igniter 2 as illustrated in FIG. 2C. After ignition of the propellant tablets 3 combustion gas created by combustion of the propellant flows back into the passage 153 and then through the passage 153 into the second chamber (as indicated by arrows C in FIG. 2D). Thus, hot combustion gas (cf. FIG. 2D: left, darker part of the "cloud" in chamber 12) mixes with cold pressurized inflation gas (right, lighter part of the cloud) that has not yet escaped from the second chamber.

As the sealing element 46 sealing the outlet opening 41 is solely broken under the impact of the pressure wave running across the pressurized inflation gas and neither under the direct impact of gas nor under the impact of combustion gas created by combustion of the propellant, in the initial inflation phase "pure" (i.e. relatively cold) pressurized inflation gas escapes from the second chamber before a mixture of inflation gas and combustion gas reaches the outlet opening 41 and flows into the gas bag. Thus, the gas bag in the first phase is filled with cold inflation gas and only in a second phase with a hotter gas mixture. The inflation performance of the gas generator according to the invention is further explained with respect to FIGS. 5A, 5B and 6.

Figure 3A:
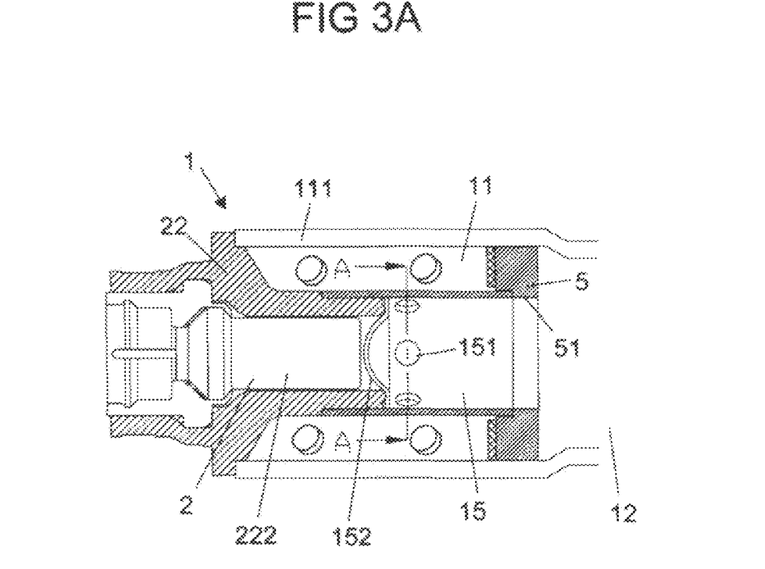
FIG. 3A illustrates a variant of the gas generator of FIG. 1.
Figure 3B:
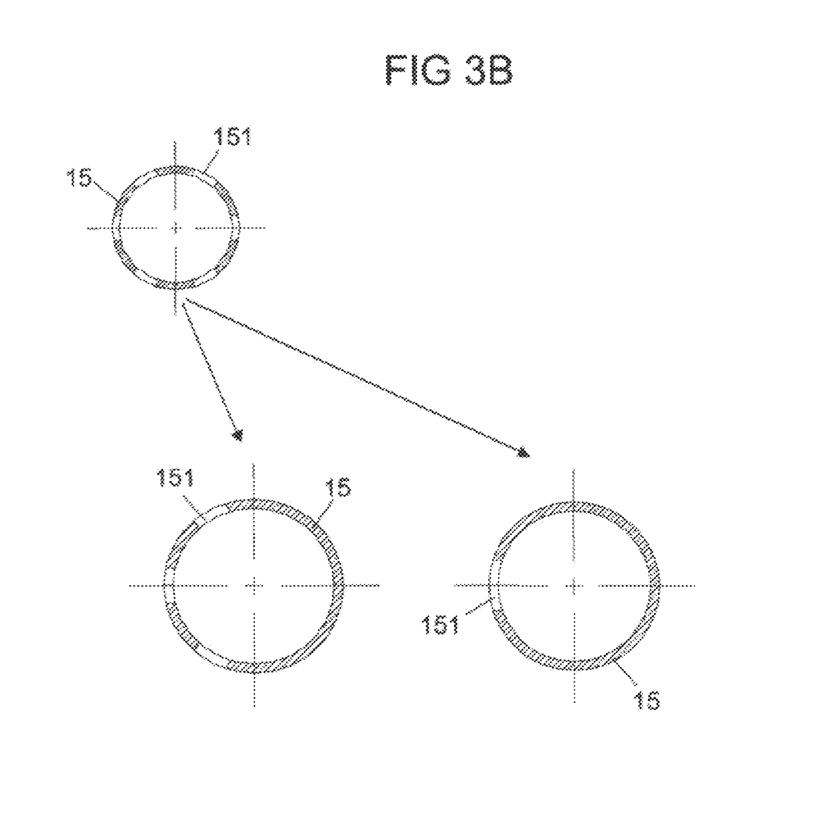
FIG. 3B illustrates variants of the gas generator of FIG. 1.

A possible variant of the gas generator discussed in FIGS. 1 and 2A to 2D is shown in FIGS. 3A and 3B, wherein FIG. 3A illustrates a sectional view through the gas generator 1 of FIG. 1 in the region of the first chamber 11. The first drawing of FIG. 3B represents a sectional view along line A-A shown in FIG. 3A disclosing that the hollow element 15 comprises a plurality of inlet openings 151 arranged in its surface, the inlet openings 151 being positioned with constant distance.

Figure 5A:
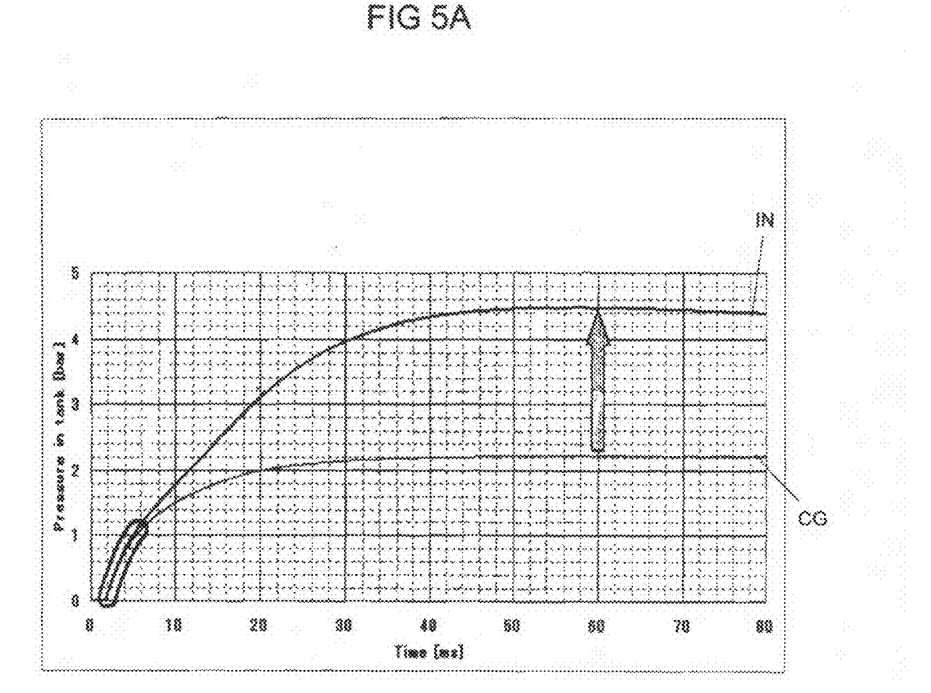
FIG. 5A illustrates the time dependency of the pressure in a test volume that is being filled with gas generated by a gas generator according to an embodiment of the invention.

FIG. 3B further shows two variants (lower drawings of FIG. 3B) of the hollow element 15, wherein the hollow element 15 according to lower left drawing comprises three inlet openings located on the same half of hollow element 15, whereas the variant of the hollow element 15 according to the right lower drawing comprises a single inlet opening 151, only. By reducing the number of openings 151 in the surface of the hollow element 15 the inflow of gas and/or heat from the igniter 2 into the first chamber 11 and the flow rate of combustion gas from the first chamber 11 into the second chamber 12 via passage 153 can be reduced. As a result, the pressure increase occurring at the outlet opening (not shown in FIG. 3A) of the gas generator when a mixture of pressurized inflation gas and combustion gas arrives at the outlet opening is reduced; more precisely the slope of the pressure-time-curve as shown, for example, in FIG. 5A is reduced.

Figure 4A:
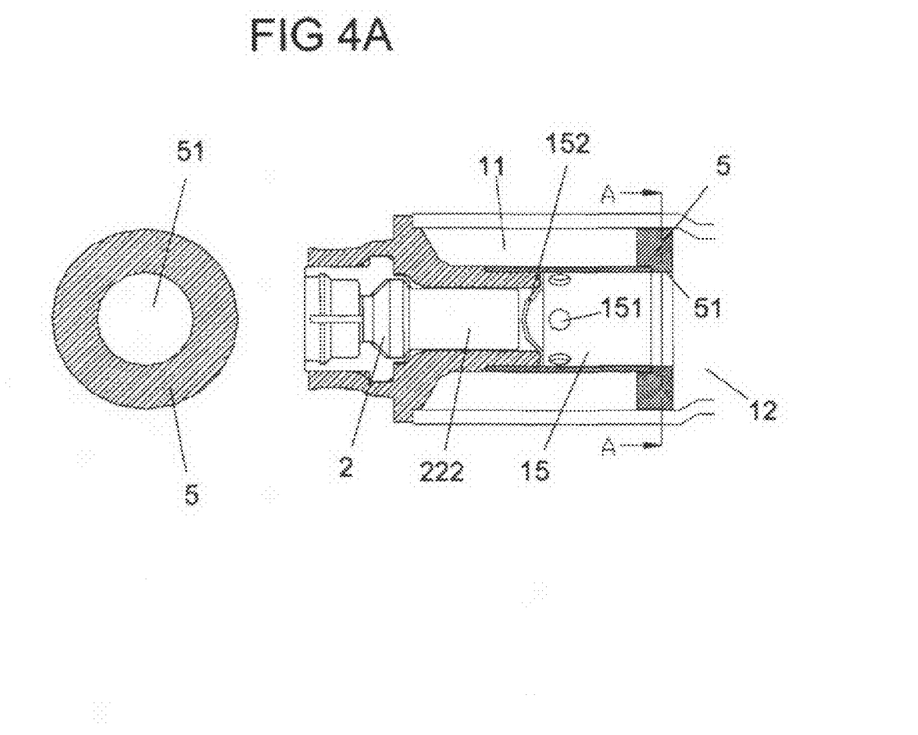
FIG. 4A illustrates a further variant of the gas generator according to FIG. 1.
Figure 4B:
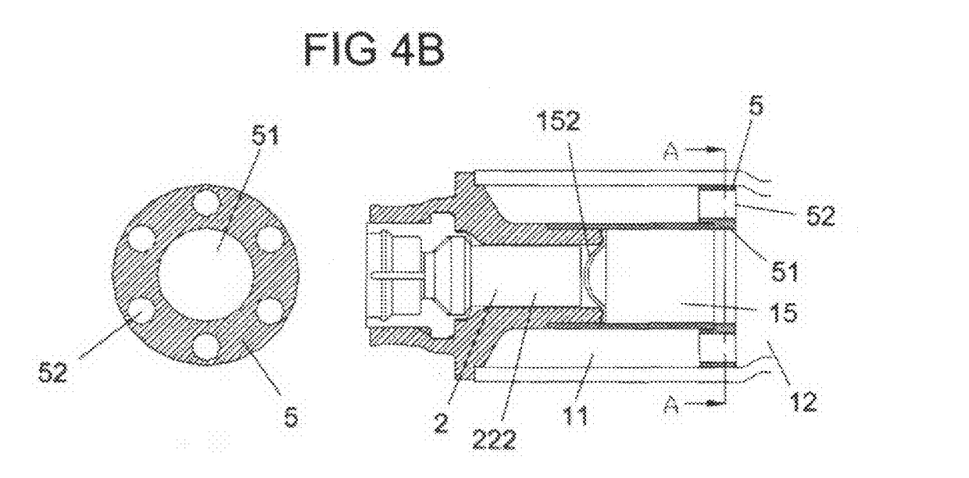
FIG. 4B illustrates a further variant of the gas generator according to FIG. 1.

FIGS. 4A and 4B relate to another variant of the gas generator shown in FIG. 1, wherein the left drawing of FIG. 4A depicts a sectional view along line A-A through the sealing element 5. The sealing element 5 is annularly shaped comprising centre bore 51. According to FIG. 4A, the sealing element 5 is continuously formed and does not comprise any through openings except the central bore 51 such that the sealing element 5 prevents direct gas flow between the first and the second chamber 11, 12.

FIG. 4B depicts a variant of FIG. 4A, wherein the sealing element 5 comprises a plurality of equally distanced further openings 52. The openings 52 on the one hand enable gas and/or heat discharged from the igniter 2 to reach the propellant located in the first chamber via the second chamber and on the other hand enable combustion gas created in the first chamber to directly flow from the first into the second chamber without having to pass through the passage 153 formed by hollow element 15 and central bore 51.

Further, as shown in FIG. 4B, the hollow element can be formed without inlet openings in its surface such that the combustion gas created in the first chamber can reach the second chamber via the openings 52 of the sealing element 5, only. However, it is also possible that in addition to the openings 52 at least one opening can be arranged in the surface of the hollow element 15.

According to the example of FIG. 4B, the gas and/or heat emerging from igniter 2 cannot flow directly into the first chamber but has to flow through the passage 153 into the second chamber 12 before being able to enter into the first chamber via the sealing element openings 52. Thus, the delay between the opening of the burst disk initially sealing the outlet opening (i.e. the beginning of gas outflow) and the creation of combustion gas in the first chamber is increased, wherein the delay can be adjusted by the number and/or position of the sealing element openings 52 and or the hollow element inlet openings 151.

Figure 5B:
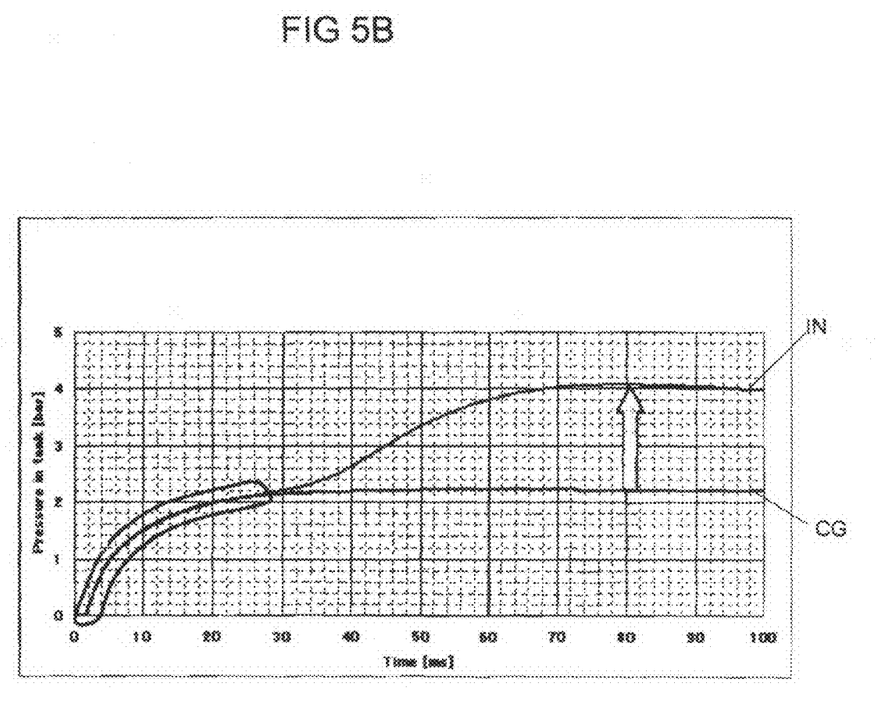
FIG. 5B illustrates the time dependency of the pressure in a test volume that is being filled with gas generated by a gas generator according to an embodiment of the invention.

The filling characteristics of the gas generator variants of FIGS. 4A and 4B, respectively, are illustrated in FIGS. 5A and 5B. These FIGS. show the time dependence of the pressure in a test volume (representing the gas bag to be inflated) that is being filled by a gas generator according to FIGS. 4A and 4B, respectively.

Curve CG shown in FIG. 5A illustrates the behaviour of a conventional cold gas generator and is shown for comparison. Using the conventional gas generator, the pressure in the test volume increases until a constant level is reached. The pressure produced by the gas generator according to the invention (curve IN) initially follows curve CG representing the conventional gas generator. However, when the combustion gas begins to enter into the second chamber (after about 6 ms from activation of the igniter) the gas output of the gas generator rises such that the pressure in the test volume exceeds the pressure achieved by the conventional gas generator. This is due to the fact that on the one hand the temperature of the combustion gas accelerates the expansion of the pressurized inflation gas and on the other hand the combustion gas provides an additional gas volume that flows into the test volume.

As depicted in FIG. 5B, the time dependency of the pressure in the test volume is changed by the modification of the passage 153 between the igniter and the second chamber (no inlet openings in hollow element 15) and the sealing ring 5 according to FIG. 4B. In particular, the appearance of a mixtures of combustion gas and pressurized inflation gas at the outlet opening is delayed such that the pressure in the test volume starts to exceed the pressure generated by a conventional gas generator only after about 25 ms from the activation of the inflator (compared to 6 ms in FIG. 5A which relates to the gas generator setup of FIG. 4A). The delay can be, for example, adjusted by modifying the number of openings 52 in the sealing element 5 and/or the number of inlet openings 151 provided by the hollow element 15. A longer delay might be useful if the gas bag comprises long flow paths such that the gas bag is unfolded enough before the hotter gas mixture enters into the gas bag. For example, curtain gas bags might require a longer delay than other side gas bags.

Figure 6:
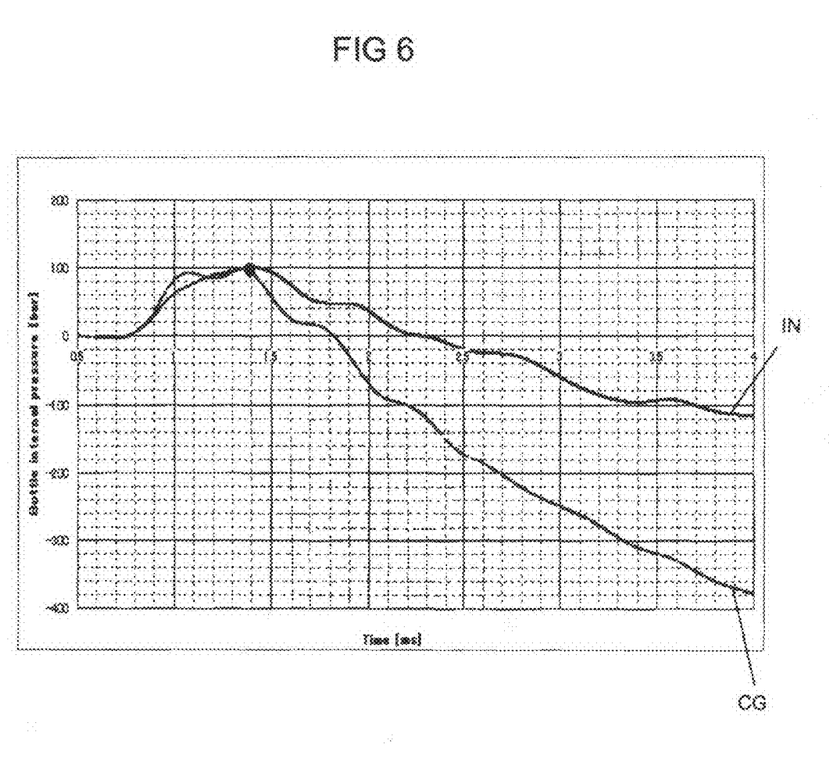
FIG. 6 illustrates the time dependency of the inner pressure in the second chamber of a gas generator according to the invention.

FIG. 6 shows the time dependency of the inner pressure (curve "IN") in the second chamber 12 of a gas generator according to the invention compared to the inner pressure (curve "CG") in a pressurized gas storing chamber of a conventional cold gas generator. Referring to curve CG, after activation of the igniter and when the inner pressure in the fillable volume of the igniter exceeds a certain value, the passage burst disk breaks such that gas suddenly expands and enters into the second chamber inducing a pressure wave that breaks the burst disk sealing the outlet opening of the second chamber (after about 1.4 ms from activation of the igniter).

Upon breakage of the burst disk sealing the outlet opening the inner pressure in the second chamber begins to drop as gas escapes from the second chamber through the unblocked outlet opening. However, the drop of the inner pressure is attenuated since hot combustion gas enters into the second chamber that accelerates the expansion of the inflation gas and also replaces inflation gas that escaped from the second chamber through the outlet opening. However, although combustion gas flows into the second chamber, the inner pressure in the second chamber never exceeds the maximum inner pressure (around 100 bar) measured in the gas storage chamber of the conventional gas generator. Therefore, the second chamber of the gas generator according to the invention can be formed by a hollow part having similar stability properties as a storage part forming the pressurized gas storage chamber of a conventional gas generator.

Figure 7A:
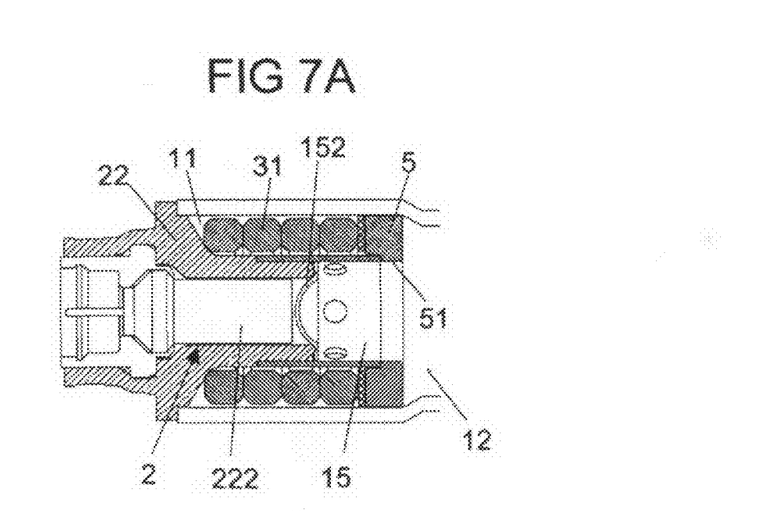
FIG. 7A illustrates a gas generator according to a further embodiment of the invention.
Figures 7B, 7C:
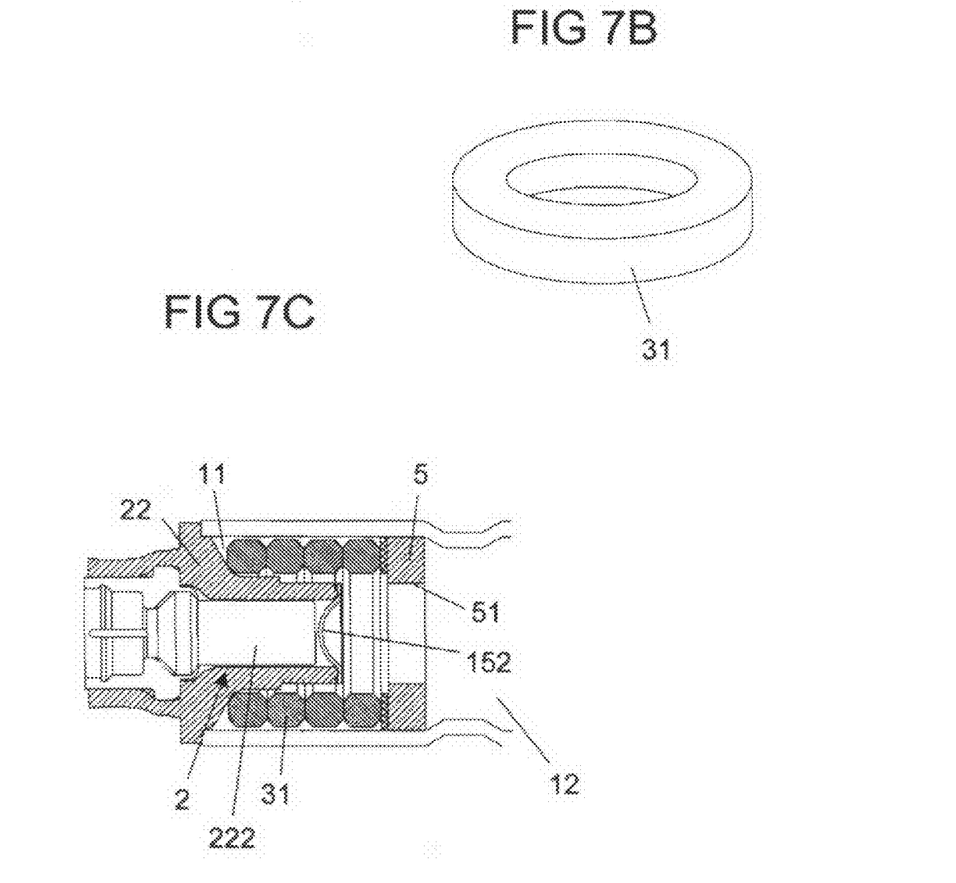
FIG. 7B illustrates a ring shaped propellant.
FIG. 7C illustrates a gas generator according to a further embodiment of the invention.

FIGS. 7A to 7C relate to further embodiments of the gas generator according to the invention. The gas generator according to these embodiments employs a propellant in the form of a plurality of ring shape propellant elements 31 instead of propellant tablets. The ring type propellant elements 31 are arranged in the (likewise ring-shaped) first chamber around at least a part of the igniter holder 22 and around at least a part of the hollow element 15.

Further, according to the variant shown in FIG. 7C, if a ring-type propellant is used the hollow element 15 can be omitted such that the passage 153 between the igniter 2 and the second chamber is formed by at least one of the propellant elements 31. Moreover, in this embodiment, the first chamber 11 is defined as the volume between the first hollow part 111 (defining an outer side wall of the first chamber), the igniter holder 22, the burst disk 152 and the sealing element 5.

It is noted, that, of course, elements of the different embodiments of the invention described above can also be used in combination. For example, a ring-type propellant could be used with the sealing element according to FIG. 4B.

What is claimed is:

1. A gas generator for inflating a gas bag of a vehicle occupant restraint system, comprising:
   an ignitor configured to produce gas and/or heat upon activation by a control signal of the vehicle;
   a first chamber comprising a propellant ignitable by gas and/or heat produced by the ignitor, wherein the ignitor is a single ignitor which both ignites the propellant and produces a pressure wave,
   a second chamber comprising pressurized inflation gas;
   at least one an outlet opening through which the inflation gas can flow out of the second chamber and into the gas bag;
   a passage through which gas and/or heat produced by the ignitor can flow from the ignitor into the second chamber;
   sealing means sealing the outlet opening,
   wherein the gas generator is configured in such a way that after activation of the ignitor gas and/or heat produced by the ignitor ignites the propellant and the pressure wave is created in the pressurized gas under the direct or indirect impact of gas produced by the ignitor, wherein the pressure wave is created by an abrupt inflow of gas produced by the ignitor into the second chamber via the passage upon activation of the ignitor, wherein the pressure wave breaks the sealing means such that inflation gas can escape from the second chamber via the outlet opening, and
   wherein the gas generator is configured in such a way that the sealing means breaks and inflation gas escapes from the outlet opening before combustion gas generated by the combustion of the propellant enters into the second chamber.

2. The gas generator according to claim 1, further comprising at least one inlet opening through which gas generated by combustion of the propellant can flow from the first to the second chamber.

3. The gas generator according to claim 1, wherein it is configured in such a way that upon breakage of the sealing means inflation gas not mixed with gas generated by combustion of the propellant exits through the outlet opening before a mixture of inflation gas and gas generated by combustion of the propellant arrives at the outlet opening.

4. The gas generator according to claim 1, wherein the outlet opening is located on a first side of the second chamber and the passage is located on a second side of the second chamber opposite to the first side.

5. The gas generator according to claim 1, further comprising a hollow element that forms part of the passage through which gas and/or heat can enter into the second chamber.

6. The gas generator according to claim 5, wherein the hollow element is surrounded by the first chamber.

7. The gas generator according to claim 1, wherein the first and the second chamber are separated by a sealing element which comprises an opening that forms part of the passage through which gas and/or heat produced by the igniting means can enter into the second chamber.

8. The gas generator according to claim 1, wherein the propellant is annularly formed.

9. A gas bag module comprising a gas bag and a gas generator according to claim 1 for inflating the gas bag.

10. The gas bag module according to claim 9, wherein it is configured in such a way that in a first phase the gas bag is inflated by pressurized inflation gas not mixed with gas generated by combustion of the propellant, and in a subsequent second phase the gas bag is inflated by a mixture of pressurized inflation gas and gas generated by combustion of the propellant.

11. The gas generator according to claim 1, wherein the single ignitor has a single cylindrical chamber.

12. A gas generator for inflating a gas bag of a vehicle occupant restraint system, comprising:
   igniting means for producing gas and/or heat upon activation by a control signal of the vehicle;
   a first chamber comprising a propellant ignitable by gas and/or heat produced by the igniting means,
   a second chamber comprising pressurized inflation gas;
   at least one an outlet opening through which the inflation gas can flow out of the second chamber and into the gas bag;
   sealing means sealing the outlet opening, wherein
   the gas generator is configured in such a way that after activation of the igniting means gas and/or heat produced by the igniting means ignites the propellant and a pressure wave is created in the pressurized gas under the direct or indirect impact of gas produced by the igniting means, wherein the pressure wave breaks the sealing means such that inflation gas can escape from the second chamber via the outlet opening,
   the igniting means comprise a volume for receiving gas produced by the igniting means upon activation, wherein the volume is sealed by further sealing means which break if the pressure in the volume exceeds a maximum value, and wherein the pressure wave is created in the inflation gas due to the breakage of the further sealing means, and the gas generator is configured in such a way that the sealing means breaks and inflation gas escapes from the outlet opening before combustion gas generated by the combustion of the propellant enters into the second chamber.

13. The gas generator according to claim 12, wherein it is configured in such a way that upon breakage of the further sealing means gas abruptly flows from the volume into the second chamber.

14. The gas generator according to claim 13, wherein the igniting means are configured in such a way that the further sealing means break under the impact of a pressure wave created in the gas present in the volume by gas and/or heat released by the igniting means into the volume.

15. The gas generator according to claim 12, wherein the volume is pre-filled with air or another gas.

16. A gas generator for inflating a gas bag of a vehicle occupant restraint system, comprising:
   igniting means for producing as and/or heat upon activation by a control signal of the vehicle;
   a first chamber comprising a propellant ignitable by gas and/or heat produced by the igniting means,
   a second chamber comprising pressurized inflation gas;
   at least one an outlet opening through which the inflation gas can flow out of the second chamber and into the gas bag;
   a passage through which gas and/or heat produced by the igniting means can flow from the igniting means into the second chamber;
   sealing means sealing the outlet opening,
   wherein the gas generator is configured in such a way that after activation of the igniting means gas and/or heat produced by the igniting means ignites the propellant and a pressure wave is created in the pressurized gas under the direct or indirect impact of gas produced by the igniting means, wherein the pressure wave is created by an abrupt inflow of gas produced by the igniting means into the second chamber via the passage upon activation of the igniting means, wherein the pressure wave breaks the sealing means such that inflation gas can escape from the second chamber via the outlet opening,
   wherein the gas generator is configured in such a way that the sealing means breaks and inflation gas escapes from the outlet opening before combustion gas generated by the combustion of the propellant enters into the second chamber, and
   a hollow element that forms part of the passage through which gas and/or heat can enter into the second chamber, wherein at least one inlet opening is arranged in the surface of the hollow element such that gas and/or heat created by the igniting means upon their activation can reach the propellant through the inlet opening.

17. The gas generator according to claim 16, wherein a plurality of inlet openings is arranged radially along the circumference of the hollow element, wherein gas from the igniting means is configured to flow into the first chamber through the at least one inlet opening, and wherein the gas generator further comprises a further sealing means arranged between the igniting means and the hollow element.

18. A gas generator for inflating a gas bag of a vehicle occupant restraint system, comprising:
   igniting means for producing gas and/or heat upon activation by a control signal of the vehicle;
   a first chamber comprising a propellant ignitable by gas and/or heat produced by the igniting means,
   a second chamber comprising pressurized inflation gas;
   at least one an outlet opening through which the inflation gas can flow out of the second chamber and into the gas bag;
   a passage through which gas and/or heat produced by the igniting means can flow from the igniting means into the second chamber;
   sealing means sealing the outlet opening,
   wherein the gas generator is configured in such a way that after activation of the igniting means gas and/or heat produced by the igniting means ignites the propellant and a pressure wave is created in the pressurized gas under the direct or indirect impact of gas produced by the igniting means, wherein the pressure wave is created by an abrupt inflow of gas produced by the igniting means into the second chamber via the passage upon activation of the igniting means, wherein the pressure wave breaks the sealing means such that inflation gas can escape from the second chamber via the outlet opening,
   wherein the gas generator is configured in such a way that the sealing means breaks and inflation gas escapes from the outlet opening before combustion gas generated by the combustion of the propellant enters into the second chamber,
   wherein the first and the second chamber are separated by a sealing element which comprises an opening that forms part of the passage through which gas and/or heat produced by the igniting means can enter into the second chamber, and
   wherein the sealing element comprises at least one further opening through which gas entered into the second chamber through the passage can flow from the second chamber to the first chamber and ignite the propellant.

19. The gas generator according to claim 7, wherein the sealing element is annularly formed.

20. A method of inflating a gas bag of a vehicle occupant restraint system, comprising the steps of:
   providing a gas generator having a first chamber comprising a propellant and a second chamber comprising pressurized inflation gas, wherein gas and/or heat produced by an ignitor can flow from the ignitor through a passage into the second chamber, wherein the ignitor is a single ignitor which both ignites the propellant and produces a pressure wave, wherein the second chamber further comprises an outlet opening sealed by sealing means through which the pressurized gas can flow into the gas bag when unsealed, wherein the sealing means breaks and the inflation gas escapes from the outlet opening before combustion gas generated by the combustion of the propellant enters into the second chamber;
   creating the pressure wave in the pressurized inflation gas by an abrupt inflow of gas produced by the ignitor into the second chamber via the passage upon activation of the ignitor, such that the sealing means are broken under the impact of the pressure wave and inflation gas escapes into the gas bag; and
   igniting the propellant and guiding gas created by combustion of the propellant upon igniting into the second chamber.

* * * * *